US 8,478,627 B2

(12) United States Patent
Cantor et al.

(10) Patent No.: US 8,478,627 B2
(45) Date of Patent: Jul. 2, 2013

(54) METHOD FOR REDUCING RISK ASSOCIATED WITH A TASK

(75) Inventors: Murray Cantor, Westwood, MA (US); Sunita Chulani, San Jose, CA (US); Robert Delmonico, White Plains, NY (US); Vedakkedathu T. Rajan, Briarcliff Manor, NY (US); Avik Sinha, New Rochelle, NY (US); Giuseppe Valetto, New York, NY (US); Mark N. Wegman, Ossining, NY (US); Clay E. Williams, New York, NY (US); Annie T. T. Ying, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 895 days.

(21) Appl. No.: 12/039,415

(22) Filed: Feb. 28, 2008

(65) Prior Publication Data

US 2009/0222275 A1    Sep. 3, 2009

(51) Int. Cl.
*G06Q 10/00* (2012.01)
*G06Q 40/00* (2012.01)

(52) U.S. Cl.
USPC ........ 705/7.28; 705/7.21; 705/7.22; 705/7.26

(58) Field of Classification Search
USPC .............................. 705/7.11–7.42
See application file for complete search history.

(56) References Cited

U.S. PATENT DOCUMENTS

| | | | | |
|---|---|---|---|---|
| 5,408,663 | A * | 4/1995 | Miller | 718/104 |
| 6,487,469 | B1 * | 11/2002 | Formenti | 700/97 |
| 6,754,897 | B1 * | 6/2004 | Ofer et al. | 718/103 |
| 7,249,042 | B1 * | 7/2007 | Doerr et al. | 705/7.23 |
| 8,000,992 | B1 * | 8/2011 | Marchbanks et al. | 705/7.27 |
| 8,112,756 | B2 * | 2/2012 | Cherkasova et al. | 718/104 |
| 2004/0015375 | A1 * | 1/2004 | Cogliandro | 705/7 |
| 2004/0054566 | A1 * | 3/2004 | J'Maev | 705/7 |
| 2005/0114186 | A1 * | 5/2005 | Heinrich | 705/7 |
| 2005/0137928 | A1 * | 6/2005 | Scholl et al. | 705/9 |
| 2005/0216324 | A1 * | 9/2005 | Maithell et al. | 705/8 |
| 2007/0143169 | A1 * | 6/2007 | Grant et al. | 705/9 |
| 2007/0162316 | A1 * | 7/2007 | Kratschmer et al. | 705/8 |
| 2008/0103871 | A1 * | 5/2008 | Ruehl et al. | 705/9 |

OTHER PUBLICATIONS

Neo et al. "Managing Risks in Information Technology Projects: A Case Study of TradeNet" (1994) Journal of Information Technology Management, vol. V, No. 3, p. 29-45.*
Mahmoudoff "Nonlinear Optimization for Project Scheduling and Resource Allocation Under Uncertainty" (Aug. 2006) (http://ecommons.cornell.edu/bitstream/1813/11724/1/Ali_Dissertation_Final.pdf).*

* cited by examiner

*Primary Examiner* — Johnna Loftis
*Assistant Examiner* — Sujay Koneru
(74) *Attorney, Agent, or Firm* — Scully, Scott, Murphy & Presser, P.C.; Daniel P. Morris, Esq.

(57) ABSTRACT

A method and system of reducing risk in the life cycle of a product, in one aspect, obtain one or more tasks required to achieve an overall task, determine risk impact of each task, the risk impact being an impact of each task on the likelihood of failure for the overall task and compute risk of overall task based on risk impacts of the tasks. The method and system utilize said risk impact of each task to schedule the tasks in such a way so as to reduce said risk of overall task as rapidly as possible.

16 Claims, 2 Drawing Sheets

METHOD FOR REDUCING RISK ASSOCIATED WITH A TASK

FIELD OF THE INVENTION

The present disclosure relates generally to managing variances in project development life cycles, and more particularly to reducing risks involved in project development life cycles.

BACKGROUND OF THE INVENTION

A general approach to managing a project determines various parameters such as cost, time to completion, resources required to complete the project and like, by first breaking down the project into a number of tasks. Each task may be broken down into subtasks, which herein are referred to also as tasks. Tasks are broken down into smaller tasks until each task is simple enough that a person with appropriate skills can both perform the task and estimate the parameters of the task. The parameters of the project are estimated by combining the parameters of the tasks that make up the entire project. For example, the cost of the project is the sum of the estimate of cost of the tasks. The schedule for performing an overall task can comprise scheduling of the individual tasks in series or parallel.

In traditional approaches, it is assumed that an expert can accurately estimate the cost and feasibility associated with a project to sufficient degree. While this may be true in some cases, such as in projects involving technology that does not change rapidly, projects requiring few or no new ideas, and projects in which the actors have sufficient control over the development of the project, it is certainly not true in many other cases. For example, development projects that seek to be innovative tend to have higher risks. It is hard to estimate the cost and feasibility of developing such projects to sufficient accuracy. This has led many such projects to fail. That is, the project fails to meet expectations of its stakeholders, for instance, in that projects fail to meet the requirements, the cost significantly exceeds the cost that is acceptable, or that it fails to meet the schedule or quality requirement, etc. This potential for failure represents the risk that a development team needs to address.

BRIEF SUMMARY OF THE INVENTION

A method and system of reducing risk associated with a project are provided. The method in, one aspect, may comprise obtaining one or more tasks required to achieve an overall task and determining risk impact of each task, the risk impact being an impact of each task on the likelihood of failure of the overall project. The method may further include computing risk of overall project based on risk impacts of the tasks and utilizing said risk impact of each task to reduce said risk of overall project.

A system for reducing risk associated with a task, in one aspect, may comprise means for obtaining one or more tasks required to achieve a project and means for determining risk impact of each task, the risk impact being an impact of each task on the likelihood of failure of the project. Said means for determining risk impact may be further operable to estimate nominal value and variance of one or more parameters associated with said each task, and to use the estimate and the dependency between tasks to compute the risk impact. The system may further comprise means for using the estimate and the dependency between tasks to compute a schedule and means for computing risk of the project based on risk impacts of the tasks. Means for utilizing said risk impact of each task to reduce said risk of the project is further operable to determine the schedule for said each task based on said risk impact.

A program storage device readable by a machine, tangibly embodying a program of instructions executable by the machine to perform the above method of reducing risk associated with a task is also provided.

Further features as well as the structure and operation of various embodiments are described in detail below with reference to the accompanying drawings. In the drawings, like reference numbers indicate identical or functionally similar elements.

DETAILED DESCRIPTION

A method and system in one embodiment of the present disclosure seeks to reduce the risk that the project does not perform in accordance with the prediction of some parameter such as the cost or schedule. To reduce the risk, the method and system of the present disclosure determines a measure of the impact of each task on the likelihood of failure for the overall project. This measure is referred to as the impact function of the task.

Figure 1:
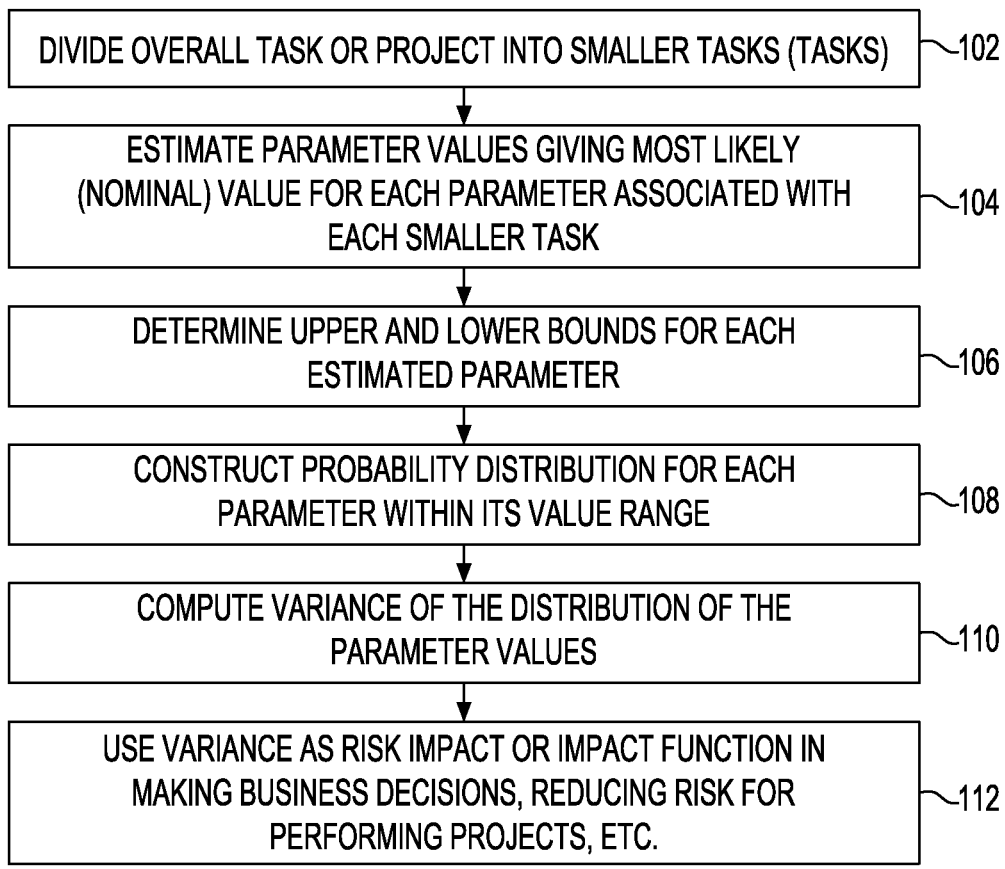
FIG. 1 illustrates a method of determining an impact function in one embodiment of the present disclosure.

An example impact function can be constructed as illustrated in FIG. 1. At 102, overall task such as a project can be divided into one or more subtasks or smaller tasks, also referred to as tasks. At 104, for each of the tasks that makes up an entire or overall task, most likely value for one or more parameters are estimated. An example of a parameter is the amount of effort (e.g., number of person-days of work) required to complete the task. At 106, upper and lower bounds for each estimated parameter are also determined. For example, this might be the maximum and minimum amount of effort required to complete this task. From this data, probability distribution is constructed for each parameter within its value range at 108. The variance of the distribution of the parameter values is then computed at 110. In one embodiment, this variance is used as a surrogate for the risk. The variances of the parameters for the task are combined to obtain the variance for the project at 112. As described above, an example of an impact function of the task is the variance of each task. In the present disclosure hereafter, the terms "impact function" and "variance" are used interchangeably. At 114, the computed impact functions for subtasks and overall task are used to reduce risk in a project and/or make business decisions.

An example of impact function is as follows. Assume that l, n and u provide the lower limit, the nominal value and the upper limit of a triangular distribution. Then the variance of the triangular distribution is given by $((u-n)^2+(n-l)^2+(u-n)*(n-l))/18$. This can be used as a measure of the risk (impact function) associated with the task. A simplified measure would be to take $(u-l)$ as a measure of the risk (impact function) associated with the task.

In one embodiment of the present disclosure, an expert may be consulted to determine estimates of the parameters for each task and a range of possible values for the parameters for each task. The expert also supplies an upper bound and a lower bound for each parameter. Alternatively or additionally, other sources such as knowledge base, expert system, historical data, or combinations thereof, may be consulted for the data needed to construct a probability distribution for each parameter.

To reduce the risk of failure of the project, the total variance of the predicted values of a given parameter, such as time for completion, for the project (also referred to as the variance of the project) is reduced. One embodiment of the method and system of the present disclosure reduces the impact function, that is, the variance of the project by executing the task with the largest variance. There are several reasons for executing the task with the largest variance. The task with largest variance represents the task about which is known the least and hence poses the greatest risk to the success of the project. If this task costs more than initially expected or takes more time than expected, then the project can be reassessed. For example, a project manager or like can allocate more resources to the project or redefine the scope of the project to make it more modest or in worst case abandon the project. Performing or executing the task with the greatest variance allows a project manager or like to make these decisions early in the project life cycle. The changes made on the basis of the experience with this task may require that changes be made to the specifications for other tasks, for example, since tasks of a project are usually related to one another. If the task with the greatest variance were not done early in the project, and thus the needed changes not discovered and implemented until after the other related tasks are executed, then those tasks would also need to be reworked, contributing to higher cost and delays to the project.

In one embodiment, to minimize the risk as rapidly as possible, the tasks are sorted according to their impact function and performed in the order of declining impact. If the estimates for the amount of effort to do the tasks (referred to as the nominal values) vary greatly, then it would be more efficient to consider another impact function such as (variance/nominal), thus reducing the variance of the project as quickly as possible. In this embodiment, the impact function is defined as (upper-lower)/nominal rather than (upper-lower) of the above example. Any relevant impact function can be used in the method and system of the present disclosure.

Figure 2:
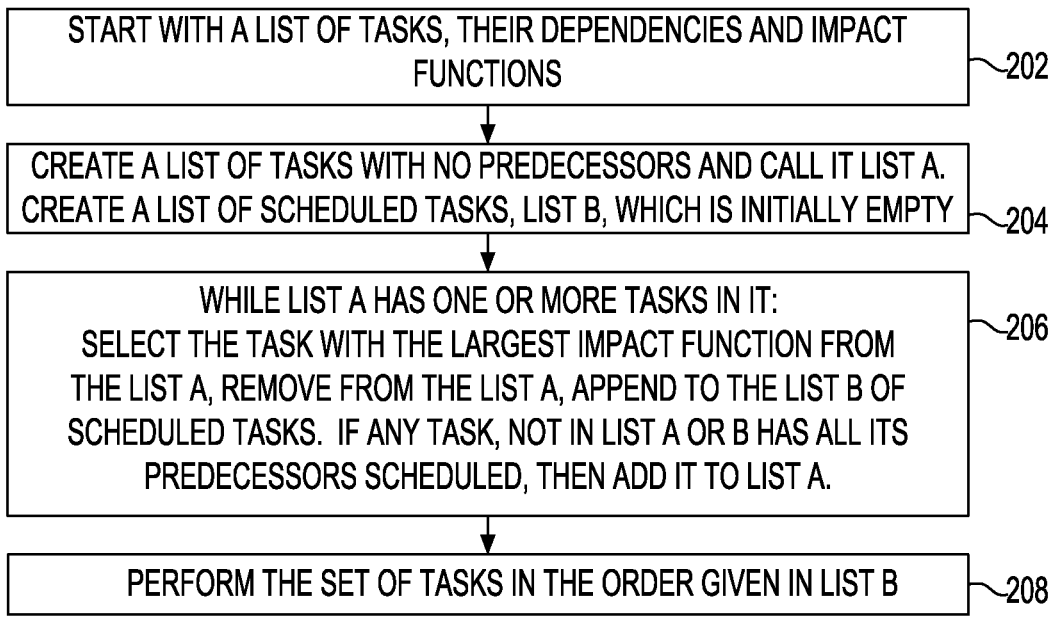
FIG. 2 illustrates a method of using the impact function in reducing risk in one embodiment of the present disclosure.

FIG. 2 is a flow diagram that illustrates the use of impact functions in reducing risk in projects. In one embodiment, the tasks are sorted and performed in the order of declining impact. Since some tasks can only be done when other tasks, referred to as predecessors, are complete, the sorting step sorts those tasks that do not have predecessors or whose predecessor tasks have been completed. Tasks form a directed acyclic graph with nodes being the tasks in the project, and the directed edges from the predecessor of each node to the successor node.

At 202, the method may start with the tasks that make up the project together with their dependencies and their impact functions. At 204, the scheduling in one embodiment may begin with a list A, that initially has the tasks that have no predecessors. The tasks in the list can be sorted according to the impact function, permitting the task with the largest impact function to be selected at the next step. A list of scheduled tasks, list B, is created which is initially empty. At 206, until list A is empty, the task with the largest impact is chosen from the list and marked as considered and removed from list A, and appended to the list of scheduled tasks, list B. If such a task is a predecessor to a second task, then since this task has already been scheduled to be done, it is marked as done as far as the successor task is concerned. If all the predecessors of the successor task has thus been scheduled, then the successor task is now available to be done, and therefore can be added to the list A, sorted according to the impact function. This procedure is continued until all tasks are marked as considered (i.e., list A is empty). Assuming the task dependence forms an acyclic graph, this procedure would provide a topological sort of all the tasks that is sorted in the order of decreasing impact given the dependence graph. Then the tasks are performed or executed in the order they were chosen as shown at 208.

Project managers are sometimes willing to pay a price in cost and schedule to reduce the risk of a project. Just as investors are willing to pay a price to buy options (call and put options) to reduce the risk to their portfolio, the project manager is willing to pay a price to reduce the risk. One way to do this is to ask early in the project development what are the potential risks in the project. Then it can be decided if there are tasks that can potentially reduce this risk. For example, if there is a possibility that the customers are unsure of their requirements, then a prototype with a user interface and limited functionality can be built and made available to the customer. The customers can then be asked to evaluate it. Customer study can ascertain that that is what the customer wanted. Similarly, if there is a question about the difficulty in integrating the different components, then a small subset of components, appropriately chosen, can be built and integrated to test the feasibility of the ideas. If there are questions about how the software components from outside are to be used, a test program can be written to test the software components, and to see if they perform as required.

An example:

Consider an example project for implementing an application for an automated teller machine (ATM) that has three tasks identified from the planning phase. This example assumes that the tasks are statistically independent. This means that the variance of a task is the sum of the variances of the subtasks. Task 1, for example, is to implement a graphical user interface of the application; task 2, for example, is to implement functionalities for a user of the system to perform monetary transactions; and task 3, for example, is to integrate various modules to provide the full functionality. It is determined from the dependence assessment that task 3 requires task 1 and task 2 to be completed. Now, suppose based on the functionality measurements and the available empirical models one computes the schedule for the various sub-tasks as shown in Table 1.

TABLE 1

| Task # | Nominal estimate for schedule | Variance on the estimated schedule | Depends on Task # |
|---|---|---|---|
| 1 | 3 months | 1 month$^2$ | |
| 2 | 3 months | 0.5 month$^2$ | |
| 3 | 2 month | 1.5 month$^2$ | 1, 2 |

Figure 3:
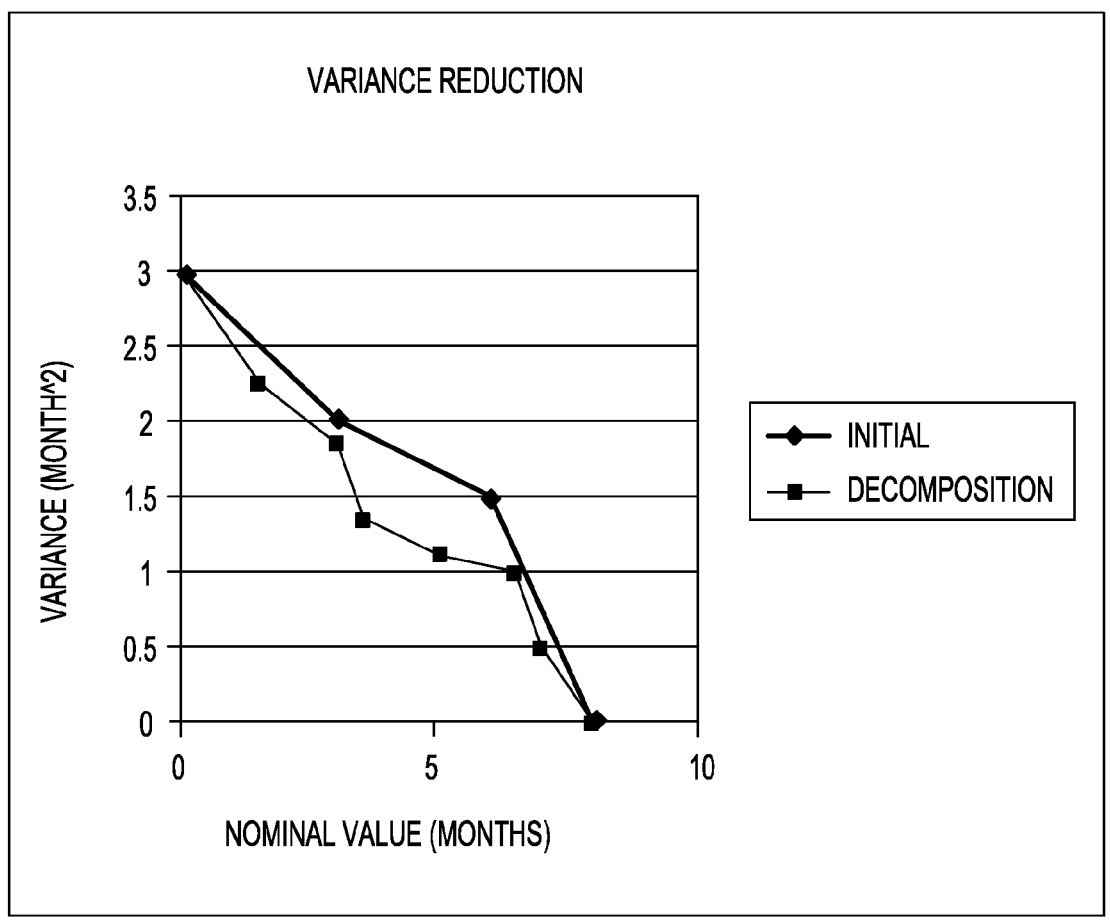
FIG. 3 is a graph showing reduced variance as a function of time in performing tasks that make up an overall task.

Notice that the variance is the square of the standard deviation and hence measured in units of month*month or month$^2$. Assume that the impact function used is the variance of each by the task 2 and then task 3. Although task 3 has the highest variance, it cannot be scheduled until tasks 1 and 2 are done. The variance reduction as a function of time is shown in the graph in FIG. 3 with legend "Initial".

Now suppose that the task 1 can be broken up into two pieces 1a and 1b, each with nominal value 1.5 months, but variance of 0.75 and 0.25 month$^2$ as shown in table 2. Similarly tasks 2 and 3 can be broken into subtasks as shown in the table. Further suppose that task 3a involves integration of 1a and 2a, and 3b involves integration of 1b and 2b and finally 3c involves integration of 3a and 3b. In such a case the tasks can be scheduled in the order 1a, 2a, 3a, 1b, 2b, 3b, 3c. The variance of the project initially will be 3 month^2, and upon the completion of each task the variance would decline as shown by the line in FIG. 3 with legend "Decomposition".

TABLE 2

| Task # | | Nominal estimate for schedule | Variance on the estimated schedule | Depends on Task # |
|---|---|---|---|---|
| 1 | 1a | 1.5 months | 0.75 month^2 | |
| | 1b | 1.5 months | 0.25 month^2 | |
| 2 | 2a, | 1.5 months | 0.4 month^2 | |
| | 2b | 1.5 months | 0.1 month^2 | |
| 3 | 3a, | 0.5 months | 0.5 month^2 | 1a, 2a |
| | 3b, | 0.5 months | 0.5 month^2 | 1b, 2b |
| | 3c | 1.0 months | 0.5 month^2 | 3a, 3b |

The method of the present disclosure in one embodiment may be embodied as a program, software, or computer instructions embodied in a computer or machine usable or readable medium, which causes the computer or machine to perform the steps of the method when executed on the computer, processor, and/or machine.

The system and method of the present disclosure may be implemented and run on a general-purpose computer or computer system and/or special-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method of reducing risk associated with a task, comprising:
   obtaining a plurality of tasks required to achieve an overall task;
   determining risk impact of each task, the risk impact being an impact of each task on the likelihood of failure of the overall task;
   computing, by a processor, risk of overall task based on risk impacts of the tasks; and
   utilizing said risk impact of each task to reduce said risk of overall task, including determining a schedule for performing said each task based on said risk impact and determining whether and when to perform the task based on said risk impact,
   wherein the determining risk impact of each task includes estimating one or more parameter values and upper and lower bounds associated with said each task, constructing probability distribution for said one or more parameter values within its value range, and determining a variance of the probability distribution, and wherein the schedule for performing said each task includes scheduling the tasks in the order of declining variance and dependency of the plurality of tasks, wherein the scheduling includes:
   beginning with a first list that initially includes tasks that have no predecessors, sorting the tasks in the first list in an order of declining risk impact, creating a second list which is initially empty, and performing following steps until the first list is empty:
      choosing the task with largest risk impact from the first list;
      marking the chosen task as considered;
      removing the chosen task from the first list;
      appending the chosen task to the second list;
      if the chosen task is a predecessor to a second task, marking the chosen task as done for purposes of the second task that is a successor to the chosen task;
      if all predecessors of the second task have been marked as done, adding the second task to the first list, and resorting the first list in the order of declining risk impact,
   wherein the predecessor to the second task is a task that needs to be performed before the second task can be performed.

2. The method of claim 1, wherein the step of determining risk impact of each task further includes:
   estimating nominal value and variance of one or more parameters associated with said each task;
   using the estimate and the dependency between tasks to compute the risk impact.

3. The method of claim 1, wherein the step of utilizing said risk impact of each task further includes:
   determining the likelihood of the overall task meeting a deadline based on said schedule.

4. The method of claim 1, where in the step of determining a schedule further includes:
   using one or more dependencies among said tasks to schedule the order in which the tasks are done.

5. The method of claim 4, wherein subject to said one or more dependencies, said tasks are sorted and scheduled in the order of decreasing risk impact.

6. The method of claim 5, further including:
   always completing the task that has no incomplete predecessors and has the highest risk impact.

7. A program storage device readable by a machine, tangibly embodying a program of instructions executable by the machine to perform a method of reducing risk associated with a task, comprising:
   obtaining a plurality of tasks required to achieve an overall task;
   determining risk impact of each task, the risk impact being an impact of each task on the likelihood of failure of the overall task;
   computing risk of overall task based on risk impacts of the tasks; and
   determining a schedule for performing said each task based on said risk impact and determining whether and when to perform the task based on said risk, wherein the determining risk impact of each task includes estimating one or more parameter values and upper and lower bounds associated with said each task, constructing probability distribution for said one or more parameter values within its value range, and determining a variance of the probability distribution, and wherein the schedule for performing said each task includes scheduling the tasks in the order of declining variance and dependency of the plurality of tasks, wherein the scheduling includes:

beginning with a first list that initially includes tasks that have no predecessors, sorting the tasks in the first list in an order of declining risk impact, creating a second list which is initially empty, and performing following steps until the first list is empty:

choosing the task with largest risk impact from the first list;

marking the chosen task as considered;

removing the chosen task from the first list;

appending the chosen task to the second list;

if the chosen task is a predecessor to a second task, marking the chosen task as done for purposes of the second task that is a successor to the chosen task;

if all predecessors of the second task have been marked as done, adding the second task to the first list, and resorting the first list in the order of declining risk impact, wherein the predecessor to the second task is a task that needs to be performed before the second task can be performed.

8. The program storage device of claim 7, wherein the step of determining risk impact of each task further includes:

estimating nominal value and variance of one or more parameters associated with said each task;

using the estimate and the dependency between tasks to compute the risk impact.

9. The program storage device of claim 8, where in the step of determining a schedule further includes:

using one or more dependencies among said tasks to schedule the order in which the tasks are done.

10. The program storage device of claim 8, where in the step of determining a schedule further includes:

using one or more dependencies among said tasks to schedule the order in which the tasks are done.

11. The program storage device of claim 10, wherein subject to said one or more dependencies, said tasks are sorted and scheduled in the order of decreasing risk impact.

12. The program storage device of claim 11, further including:

always completing the task that has no incomplete predecessors and has the highest risk impact.

13. A system for reducing risk associated with a task, comprising:

means for obtaining a plurality of tasks required to achieve an overall task;

means operable to execute on a processor for determining risk impact of each task, the risk impact being an impact of each task on the likelihood of failure of the overall task, said means for determining risk impact further operable to estimate nominal value and variance of one or more parameters associated with said each task, and to use the estimate and the dependency between tasks to compute the risk impact;

means for using the estimate and the dependency between tasks to compute a schedule;

means for computing risk of overall task based on risk impacts of the tasks; and means for utilizing said risk impact of each task to reduce said risk of overall task, said means for utilizing further operable to determine the schedule for performing said each task based on said risk impact, and whether and when to perform the task based on said risk impact, wherein the determining risk impact of each task includes estimating one or more parameter values and upper and lower bounds associated with said each task, constructing probability distribution for said one or more parameter values within its value range, and determining a variance of the probability distribution, and wherein the schedule for performing said each task includes scheduling the tasks in the order of declining variance and dependency of the plurality of tasks, wherein the scheduling includes:

beginning with a first list that initially includes tasks that have no predecessors, sorting the tasks in the first list in an order of declining risk impact, creating a second list which is initially empty, and performing following steps until the first list is empty:

choosing the task with largest risk impact from the first list;

marking the chosen task as considered;

removing the chosen task from the first list;

appending the chosen task to the second list;

if the chosen task is a predecessor to a second task, marking the chosen task as done for purposes of the second task that is a successor to the chosen task;

if all predecessors of the second task have been marked as done, adding the second task to the first list, and resorting the first list in the order of declining risk impact wherein the predecessor to the second task is a task that needs to be performed before the second task can be performed.

14. The system of claim 13, wherein said overall task is a sub-task of a project, wherein the sub-task is broken down into said one or more tasks.

15. The method of claim 1, wherein said overall task is a sub-task of a project, wherein the sub-task is broken down into said one or more tasks.

16. The program storage device of claim 7, wherein said overall task is a sub-task of a project, wherein the sub-task is broken down into said one or more tasks.

* * * * *